Aug. 26, 1952 — W. O. SMALL — 2,608,300
FLOATING LIQUID-LIQUID SEPARATOR
Filed July 3, 1948 — 2 SHEETS—SHEET 1
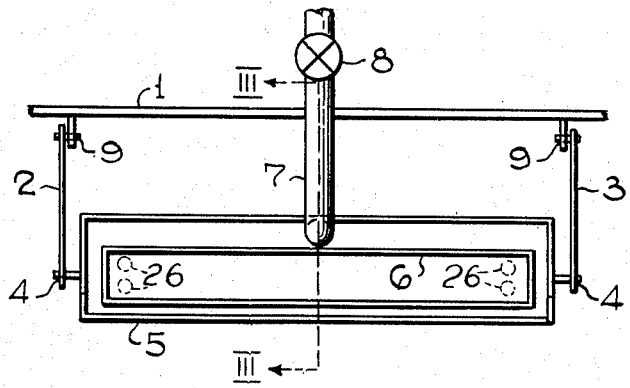
FIG.-I
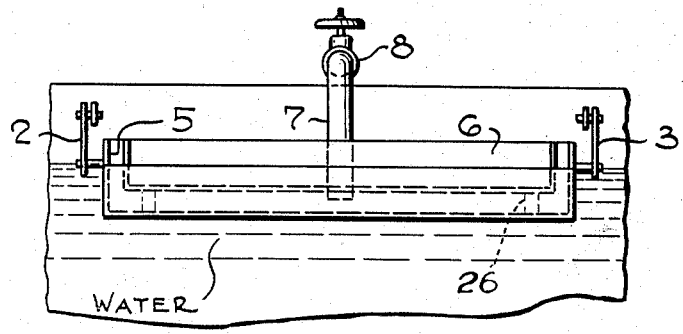
FIG.-II
William O. Small  Inventor
By W. O. J. Hilman  Attorney Aug. 26, 1952 W. O. SMALL 2,608,300
FLOATING LIQUID-LIQUID SEPARATOR
Filed July 3, 1948 2 SHEETS—SHEET 2
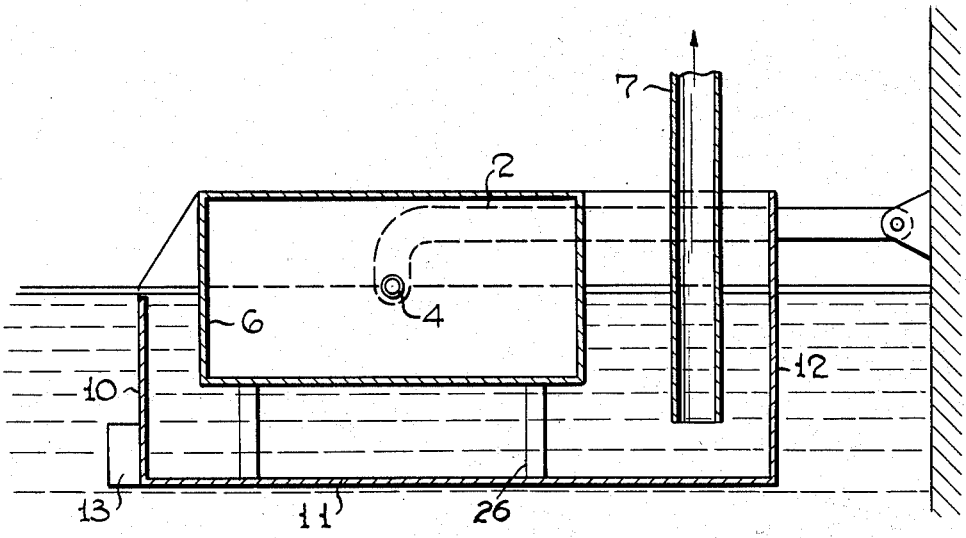
Fig.-III
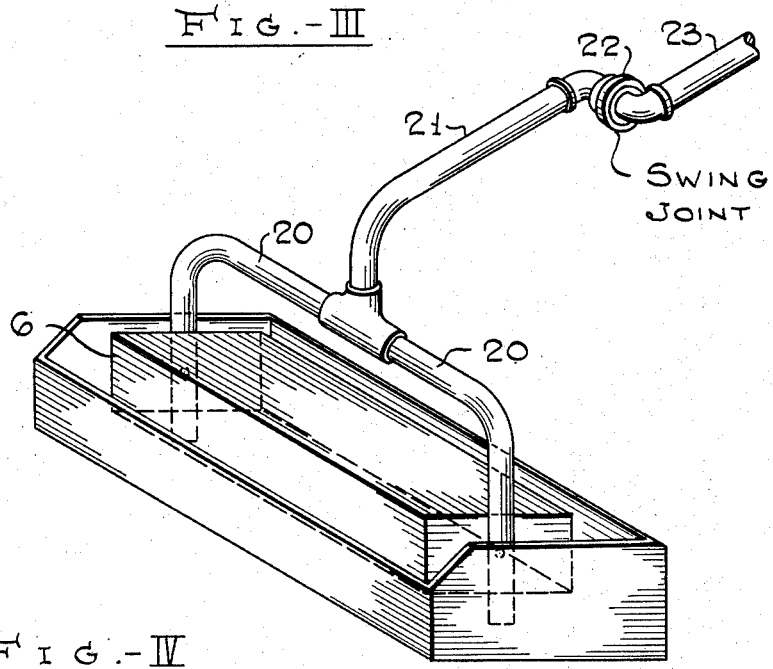
Fig.-IV
William O. Small Inventor
By W. O. Hilman Attorney Patented Aug. 26, 1952

2,608,300

UNITED STATES PATENT OFFICE 2,608,300

FLOATING LIQUID-LIQUID SEPARATOR

William O. Small, Towson, Md., assignor to Standard Oil Development Company, a corporation of Delaware Application July 3, 1948, Serial No. 37,020

6 Claims. (Cl. 210—51)

The present invention relates to an improved apparatus for separating two liquid phases of different density. The apparatus of this invention is of particular application to the separation of an oil film on water or to the separation of any other liquid system providing a lighter liquid layer floating on a body of heavier liquid. In accordance with this invention, an improved floating skimmer for removing the top layer of liquids is provided. The skimmer is adapted to permit the removal of the upper liquid automatically and continually without requiring readjustments due to changes in total liquid depth and without breaking the pumping suction due to the use of an excessive pumping rate from the skimmer.

Frequently throughout the chemical industry generally, and particularly in the oil refining industry, the need arises for separating two liquids of different densities. For example, it is frequently necessary to separate a layer of oil from a layer of water. Conventionally, skimmers are employed for this object, which are positioned on the surface of the liquids in such a way as to permit the overflow of the upper liquid into the skimmer. Presently known skimmers are of two types. In one type the skimmer is fixed to the walls of the tank, or vessel in which the liquid layers are to be separated, and the particular level of the skimmer is adjusted by manual operation of screws or other elevational control means. The disadvantages of this type of skimmer are apparent. In particular it is necessary to frequently readjust the position of the skimmers to compensate for changes in liquid level in the separator tank. Skimmers are also known to the art which are of the floating type. In general, the presently known floating skimmers are sustained on floating buoys which hold the skimmer on the surface of the liquid in a manner adapted to permit the uppermost liquid layer to overflow into the skimming device. Skimmers of this type overcome the principal disadvantage characteristic of fixed skimmers in that they automatically compensate for changes in the liquid level. However, presently known floating skimmers are still subject to at least one serious difficulty. The principal difficulty is that the pumping rate from the skimmer must be closely controlled to prevent withdrawing more liquid from the skimmer than can flow into the skimmer. If this condition is not fulfilled, the pumping suction applied to remove the liquid from the skimmer is broken, the skimmer floats sufficiently high to prevent liquid from flowing into it, and the system is at least temporarily made inoperative.

It is therefore the principal object of this invention to provide an improved type of skimmer which will float on the liquids to be separated so as to adjust automatically to changes in the total liquid level, and also to tilt in such a manner as to cause the rate of liquid influx into the skimmer to equal the pumping rate from the skimmer, so that the pumping suction cannot be broken. Use of the improved skimmer of this invention is particularly advantageous when a battery of skimmers are employed from which the skimmed liquid is removed by a common pumping manifold. In such a system all skimmers are rendered inoperative in the event the pumping suction to any one of them is broken.

The objects and advantages of this invention will be more fully understood from a consideration of the following description in connection with the accompanying drawings. In these drawings preferred embodiments of the apparatus of this invention are illustrated.

Figure I represents a top view of one embodiment of this invention showing a skimmer in operative position.

Figure II, related to Figure I, shows this same skimmer in elevation.

Figure III shows a cross-sectional view of the skimmer through the line III—III of Figure I, and Figure IV shows an alternative means for positioning the skimmer in a tank or vessel.

Referring now to Figure I, the numeral 1 designates a wall of the tank or vessel containing the two liquids to be separated. This wall may comprise a concrete barrier, a wood or metallic wall, or any other desired type of liquid retaining material. Extending perpendicularly from wall 1 are two arms or supports 2 and 3. These supports are arranged to position the skimmer in a desired position in the separator tank. The supports 2 and 3 are pivoted to both the wall 1 and to the skimmer as indicated. By this means, changes in the level of the liquid in the separator tank, will permit the skimmer (pivoting about the pivot points 9, 9) to rise or fall as required or in other words, to float freely on the liquid. As will be seen, this arrangement also will permit the skimmer to tip about the pivot points 4, 4.

The skimmer may comprise an outer rectangular box 5 having one side somewhat cut away to provide a weir for liquid to flow into the rectangular box. Positioned within the skimmer is a closed rectangular tank 6 which is fixed to the upper portion of the skimmer as by means of tie rods 26 illustrated in Figures I, II and III. Consequently, a liquid passageway exists beneath the bottom of the closed tank 6 and around the ends of the closed tank. The tank 6 is so positioned in the rectangular box 5 that a greater amount of liquid lies within the box 5 on one side of tank 6 than on the other side. In other words, the tank 6 is non-symmetrically placed in the box 5. A pumping line 7, which may comprise rigid piping, extends downwardly into the box 5 so as to permit pumping liquid from the box. Line 7 may be provided with a valve 8, and may lead to a somewhat larger line which may serve as a pumping manifold for a plurality of skimmers. Consequently, when liquid flows into the box 5, it may be pumped through line 7 to be disposed of as desired.

In the arrangement described, liquid flows into the box 5 over the side of the box providing a weir so that normally the box is filled with liquid to the level of the weir. The closed tank 6 is designed to provide sufficient boyancy so that the rectangular box is caused to float in essentially this condition. The center of buoyancy and the center of gravity of this apparatus is caused to lie in the same vertical plane so that normally the skimmer floats in a horizontal position.

Referring now to Figure III, a cross-sectional view of the skimmer is shown which indicates more clearly the novel features of the arrangement described. It will be noted that the plates 10, 11 and 12, together with suitable end plates, define the rectangular box 5 formerly referred to. The plate 10 is shorter than the plate 12 so as to effectively provide a weir to permit liquid to flow over the plate 10 into the rectangular box. It will be noted that tank 6 is positioned in the upper part of the box, and is positioned so as to be closer to the plate 10 than to the plate 12. While the particular positioning of the buoyant tank 6 within the vessel 5 is not critical, it has been found to be preferred to position the tank 6 about four times as far from one side of the vessel 5 as from the other side. The suction line 7 for pumping liquid from the skimmer leads into the larger of the two spaces provided by the walls of the box and the tank 6. As indicated, the entire skimmer device illustrated in Figure III is pivoted at points 4 by the supports 2 and 3. As this arrangement would normally cause the right side of the box 5 to be less buoyant than the left side, a suitable counterweight 13 is provided on the left side of the skimmer. The weight 13 may consist of lead or any other desired heavy body, simply serving the function of balancing the apparatus illustrated. When the liquid has flowed over the weir 10 into the box until the liquid level is somewhat above the top of weir 10, the entire skimmer will be maintained in a stable horizontal floating condition as illustrated.

The manner in which the skimmer operates and the advantages thereof may now be appreciated. It is apparent that the provision of means for the supports 2 and 3 to pivot in a vertical direction enables the floating skimmer to rise and fall as the liquid level in the entire tank changes. It will also be noted that when pumping suction is applied to the line 7 there will be a tendency to drop the liquid level within the box 5. Consequently, there will be a tendency for the right side of the skimmer, referring to Figure III, to lift in the liquid. This will be due to the drop in liquid level within the skimmer, resulting in an increase in the buoyancy of the right side of the skimmer relative to the left side. As a result the skimmer will tend to pivot, tilting so as to depress the weir 10 further below the liquid level. Even though the pumping rate applied through line 7 is excessively greater than the liquid inflow over the weir 10, the consequent tipping of the skimmer about the pivot points of the supports will cause the weir 10 to tip downwardly so as to permit more liquid to flow into the skimmer so as to compensate for the pumping rate. As a result of these factors, it is impossible to break the suction on pumping line 7, as the faster the pumping rate the more the skimmer tips and the greater the quantity of liquid which flows into the skimmer.

The precise manner in which the desired tilting of the skimmer is accomplished may be appreciated particularly by considering Figure III of the drawings. It is to be noted that the outer vessel or box defined by the sides 10 and 12 and the bottom 11 is of a nature to normally float on a liquid when not filled with liquid. When, for example, liquid is withdrawn from the vessel through withdrawal 7 so as to cause the liquid level to drop below the weir 10 the vessel will tend to float. It will be noted that the center of buoyancy of the vessel by itself is substantially in a vertical plane midway between sides 10 and 12. However, the center of support 4 provided by buoy 6 is horizontally displaced from the center of buoyancy of the outer vessel or skimmer; the center of support is positioned between the weir 10 and the center of buoyancy of the skimmer. As a result, when the liquid level drops within the skimmer, the positive buoyancy of the skimmer creates a buoyant torque, causing the entire apparatus to tilt to depress the weir as described. When, however, liquid influx to the skimmer tends to bring the liquid level above the level of the weir, the negative buoyancy of the skimmer thus created, tends to tilt the skimmer in the opposite direction to raise the weir sufficiently to decrease the flow of liquid into the skimmer.

Illustrated in Figure IV is an alternative means for supporting the skimmer in the tank or vessel in which it is used. The apparatus in Figure IV is particularly adapted for application to the separation of liquids contained in tanks having a considerable fluctuation in liquid level. This embodiment is useful, for example, for the separation of oil from sea water subject to the rise and fall of the tides. Referring now to Figure IV, it will be noted that the skimmer itself is of the same construction as formerly described. The skimmer is pivoted on a support 20 which in this embodiment represents a pipe line. The pipe line extends over the tank 6 of the skimmer in a bracket arrangement to permit pivoting of the skimmer on both ends. From the mid point of this bracket arrangement, a pipe line 21 extends upwardly toward the side or top of the tank in which the skimmer is positioned. As described, therefore, the pipe line 21 and line 20 meet centrally above the skimmer in a T arrangement. This T joint is a fixed joint. The line 21 is maintained in connection with a line 23 by a swing joint 22 so that line 21 can rise or fall in a vertical plane. By this means it is possible for the skimmer to rise or fall as required in response to a great variation in liquid level within the tank.

It is apparent that this invention may be modified in many ways. For example, the materials of construction of the apparatus of this invention may be so chosen as to permit application to any type of liquid-liquid separation. Thus, in an oil-water type of separation, the skimmer may consist of steel or iron, while for the separation of corrosive liquids, the skimmer may consist of non-corrosive synthetic plastics, wood or other materials. While the floating tank 6 has been illustrated as being a substantially rectangular tank positioned within the body of the skimmer, it is apparent that if desired, suitable floats may be provided externally of the skimmer. Again, it is apparent that the configuration of the skimmer itself may depart from the rectangular form described and particularly, that the skimmer may be designed so that it is not necessary to employ the counterweight 13. For example, this may be accomplished by sloping the bottom of the buoyant tank 6, or by sloping the bottom of the vessel 5 to suitably change the center of buoyancy of the skimmer. Many other modifications and adaptations of this invention are possible.

As stated, therefore, the present invention comprises a novel type of floating skimmer. The skimmer is adapted to not only rise and fall with changes in liquid level, but also to tip in such a manner as to compensate for the pumping rate applied to the skimmer so as to prevent breaking the suction applied. As stated, a skimmer of the nature described operates particularly well in combination with other skimmers of the same type. It is possible to set the flow regulating valve on each skimmer so that the desired proportion of liquid is withdrawn from each skimmer and so that the total amount of liquid withdrawn from a given system may then be controlled by varying the pumping pressure applied to a common manifold of all of the skimmers. There is no danger or possibility of admitting air to the pumping line or of breaking the suction in any of the individual skimmers.

What is claimed is:

1. A floating liquid-liquid separator comprising in combination, a vessel having closed bottom and side elements tending to cause said vessel to float on a body of liquid, said vessel thereby having buoyancy and a center of buoyancy, at least one of said side elements being cut away to provide a weir for the flow of liquid into said vessel, at least one buoy fixed to said vessel adapted to float said vessel when filled with liquid to the height of the said weir, said buoy being fixed to said vessel in a positional relation causing the center of gravity of the vessel and buoy and the center of buoyancy of the vessel and buoy to lie in a vertical plane, and said positional relation causing the center of buoyancy of the said vessel by itself to be horizontally displaced from the center of buoyancy of the vessel and buoy together, whereby changes in liquid level within the said vessel cause the vessel and buoy to rotate about the center of gravity, and a liquid withdrawal conduit extending into said vessel below the level of the weir.

2. A floating liquid-liquid separator comprising in combination, a buoyant vessel having closed bottom and side elements, and having a center of buoyancy, at least one of said side elements being cut away to provide a weir spaced from the bottom of the vessel for the flow of liquid into said vessel, a buoy fixed within said vessel at least in part below the height of the weir above the bottom of the vessel, whereby said buoy exerts a buoyant force and has a center of buoyancy when the said vessel is filled with liquid to the level of the weir, said buoy being positioned within said vessel so that the center of buoyancy of the said buoy lies at a point between the said weir and the center of buoyancy of the said vessel, whereby changes of liquid level within the vessel develops a buoyant torque acting on the vessel-buoy combination, and a liquid withdrawal conduit extending into said vessel below the level of the weir.

3. A floating liquid-liquid separator comprising in combination, a vessel having sides extending above the bottom of the vessel, a portion of said sides terminating at a lower level with respect to the bottom than the remainder of the sides providing a weir for the flow of liquid into the vessel, a buoy fixed to said vessel of sufficient buoyant force to float the said vessel when filled with liquid to the level of the weir, and a liquid withdrawal conduit extending into said vessel below the level of the weir, whereby withdrawal of liquid from the vessel dropping liquid level within the vessel below the weir creates an additional buoyant force contributed by the vessel, said buoy having a first center of buoyancy and said vessel having a second center of buoyancy, and said buoy being fixed with respect to said vessel to position said first center of buoyancy between the said weir and the said second center of buoyancy, whereby changes of liquid level within said vessel creates a buoyant torque tipping said floating separator.

4. A floating liquid-liquid separator arranged in a tank containing one liquid layer floating on a body of heavier liquid comprising in combination, a buoyant vessel having closed bottom and side elements, and having a center of buoyancy, at least one of said side elements being cut away to provide a weir spaced from the bottom of the vessel for the flow of liquid into said vessel, a buoy fixed within said vessel at least in part below the height of the weir above the bottom of the vessel, whereby said buoy exerts a buoyant force and has a center of buoyancy when the said vessel is filled with liquid to the level of the weir, said buoy being positioned within said vessel so that the center of buoyancy of the said buoy lies at a point between the said weir and the center of buoyancy of the said vessel, whereby changes of liquid level within the vessel develops a buoyant torque acting on the vessel-buoy combination, a liquid withdrawal conduit extending into said vessel below the level of the weir, and supports extending from said tank to said vessel and buoy pivotally fixed to said vessel and buoy whereby the position of the vessel on the liquid is fixed with regard to the tank while permitting the vessel to tilt and to rise and fall on the liquid.

5. A floating liquid-liquid separator arranged in a tank containing one liquid layer floating on a body of heavier liquid comprising in combination, a buoyant vessel having closed bottom and side elements, and having a center of buoyancy, at least one of said side elements being cut away to provide a weir spaced from the bottom of the vessel for the flow of liquid into said vessel, a buoy fixed within said vessel at least in part below the height of the weir above the bottom of the vessel, whereby said buoy exerts a buoyant force and has a center of buoyancy when the said vessel is filled with liquid to the level of the weir, said buoy being positioned within said vessel so that the center of buoyancy of the said buoy lies at a point between the said weir and the center of buoyancy of the said vessel, whereby changes of liquid level within the vessel developes a buoyant torque acting on the vessel-buoy combination, and at least one liquid withdrawal conduit including a swing joint extending into said vessel below the level of the weir, said withdrawal conduit being pivotally fixed to said vessel and buoy.

6. A floating liquid-liquid separator arranged in a tank containing one liquid layer floating on a body of heavier liquid comprising in combination, a buoyant vessel having closed bottom and side elements, and having a center of buoyancy, at least one of said side elements being cut away to provide a weir spaced from the bottom of the vessel for the flow of liquid into said vessel, a buoy fixed within said vessel at least in part below the height of the weir above the bottom of the vessel, whereby said buoy exerts a buoyant force and has a center of buoyancy when the said vessel is filled with liquid to the level of the weir, said buoy being positioned within said vessel so that the center of buoyancy of the said buoy lies at a point between the said weir and the center of buoyancy of the said vessel, whereby changes of liquid level within the vessel developes a buoyant torque acting on the vessel-buoy combination, a liquid withdrawal conduit extending into said vessel below the level of the weir, and a counterweight fixed to said vessel at the side of the vessel provided with a weir.

WILLIAM O. SMALL.

REFERENCES CITED

The following references are of record in the file of this patent:

UNITED STATES PATENTS

| Number | Name | Date |
|---|---|---|
| 22,757 | Washington | Jan. 25, 1859 |
| 289,877 | Wilson | Dec. 11, 1883 |
| 418,984 | Parks, Jr. | Jan. 7, 1890 |
| 513,474 | Bate | Jan. 30, 1894 |
| 538,461 | Noble | Apr. 30, 1895 |
| 1,450,545 | Hans | Apr. 3, 1923 |
| 2,330,508 | McColl | Sept. 28, 1943 |
| 2,356,469 | Pearson | Aug. 22, 1944 |
| 2,497,177 | McClintock | Feb. 14, 1950 |